United States Patent [19]

Finn et al.

[11] 4,291,918
[45] Sep. 29, 1981

[54] BUCKLE ASSEMBLY FOR CONTINUOUS LOOP OCCUPANT RESTRAINT BELT SYSTEM

[75] Inventors: Bernard J. Finn, Troy; Brian T. Haddlesey, Sterling Heights; Kenneth H. Reid, Mt. Clemens, all of Mich.

[73] Assignee: General Motors Corporation, Detroit, Mich.

[21] Appl. No.: 77,009

[22] Filed: Sep. 19, 1979

[51] Int. Cl.³ .................. B60R 21/00; A62B 35/00
[52] U.S. Cl. .................................... 297/483; 24/193; 280/808; 297/476
[58] Field of Search ............... 297/476, 468, 483; 280/801, 808, 803; 24/78, 193, 196, 170, 191

[56] References Cited

U.S. PATENT DOCUMENTS

| | | |
|---|---|---|
| 2,528,078 | 10/1950 | Quilter . |
| 3,063,116 | 11/1962 | Mihalyi . |
| 3,197,832 | 8/1965 | McCauley ............... 24/78 |
| 3,258,293 | 6/1966 | Sharp . |
| 3,317,243 | 5/1967 | Weman . |
| 3,551,961 | 1/1971 | Nygren ................. 24/196 |
| 3,686,715 | 8/1972 | Brodniki ............... 24/170 |
| 3,817,474 | 6/1974 | Board .................. 297/476 |
| 3,888,541 | 6/1975 | Stephenson ........... 24/78 X |
| 3,898,715 | 8/1975 | Balder ................. 24/196 |
| 3,911,535 | 10/1975 | Mauron ................ 24/170 |
| 3,941,419 | 3/1976 | Blom .................... 24/78 |
| 4,069,554 | 1/1978 | Minolla ................ 24/196 |

Primary Examiner—James T. McCall
Attorney, Agent, or Firm—Charles E. Leahy

[57] ABSTRACT

A buckle assembly for a continuous loop lap and shoulder restraint belt system includes a latch plate assembly carried by the belt and a buckle mounted on the body. The latch plate includes a housing having a cinching member pivotally mounted thereon. The continuous loop belt passes around the cinching member. The buckle has a lip member on the buckle housing which projects into proximity with the restraint belt generally along one side of the cinching member to provide an abutment surface against which the cinching member may clamp the restraint belt. When a load is imposed on the lap belt portion of the continuous loop belt, the cinching member is rotated in the direction to clamp the belt against the abutment surface of the buckle housing to prevent sliding movement of the continuous loop belt in the direction to increase the length of the lap belt. When a load is imposed on the shoulder belt portion of the continuous loop belt, the cinching member is pivoted in the opposite direction to unclamp the continuous loop belt and permit sliding movement of the belt in the direction to shorten the lap belt portion and lengthen the shoulder belt portion. When the latch plate is disengaged from the buckle the belt may pass freely in either direction around the cinching member so that the latch plate is free falling to a desired position along the belt.

2 Claims, 5 Drawing Figures

BUCKLE ASSEMBLY FOR CONTINUOUS LOOP OCCUPANT RESTRAINT BELT SYSTEM

BACKGROUND OF THE INVENTION

The invention relates generally to an occupant restraint belt system and, more particularly, provides a buckle assembly comprised of a buckle and a latch plate which are effective to cinch the sliding movement of a continuous loop restraint belt therethrough when the latch plate is engaged within the buckle.

It is well-known to provide an occupant restraint system comprised of a continuous loop belt having an upper end mounted on a vehicle body generally adjacent the occupant shoulder and a lower end mounted on the vehicle body generally adjacent the occupant hip. A latch plate is slidable along the continuous loop belt to define a lap belt portion and a diagonal shoulder belt portion. A buckle is mounted on the vehicle body at the opposite side of the seat and selectively and releasably engages with the latch plate to establish the belt system in the restraining position.

Prior patent Blom U.S. Pat. No. 3,941,419 recognizes the desirability of providing a lock bar within a latch plate slidable along the continuous loop belt for clamping the belt against the housing of the buckle component when a load is imposed on the belt so that the continuous loop belt is permitted to slide through the buckle component in only the one direction which tightens the lap belt. Blom also teaches the arrangement of the lock bar and the housing in a manner which routes the continuous loop belt straight through the latch plate when the continuous loop belt is established in a generally vertical stowed position along the wall of the passenger compartment so that the latch plate is free falling to a predetermined desired elevation along the belt in order to facilitate subsequent gripping by the seated occupant.

Sharp U.S. Pat. No. 3,258,293 shows a similar lock bar provided within a buckle slidable along the continuous loop belt and effective to provide only one way sliding movement of the belt through the buckle when the engagement of the buckle with the latch plate turns the buckle to a substantially colinear or parallel relationship with the belt portions. When the buckle is established in a normal attitude with respect to the belt portion, the belt slides freely about the lock bar in either direction.

SUMMARY OF THE INVENTION

The present invention provides a new and improved buckle assembly for a continuous loop lap and shoulder restraint belt system. According to the invention a latch plate assembly carried by the belt includes a latch plate housing having a cinching member pivotally mounted thereon. The continuous loop belt passes around the cinching member. A buckle mounted on the vehicle body has a lip member on the buckle housing which projects into proximity with the restraint belt generally along one side of the cinching member to provide an abutment surface against which the cinching member may clamp the restraint belt. When a load is imposed on the lap belt portion of the continuous loop belt, the cinching member is rotated in the direction to clamp the belt against the abutment surface of the buckle housing to prevent sliding movement of the continuous loop belt in the direction to increase the length of the lap belt. When a load is imposed on the shoulder belt portion of the continuous loop belt, the cinching member is pivoted in the opposite direction to unclamp the continuous loop belt and permit sliding movement of the belt in the direction to shorten the lap belt portion and lengthen the shoulder belt portion. When the latch plate is disengaged from the buckle the belt may pass freely in either direction around the cinching member so that the latch plate is free falling to a desired position along the belt.

OBJECT OF THE INVENTION

The object, feature and advantage of the invention resides in the provision of a pivotally mounted cinching member on a latch plate slidable along a continuous loop belt, and a lip member on the housing of the mating buckle adapted to provide a clamping surface against which the pivot member clamps the continuous loop belt against sliding movement through the latch plate when the latch plate is engaged with the buckle.

These and other features, objects and advantages of the invention will become apparent upon consideration of the specification and the appended drawings in which:

FIG. 1 is a longitudinal sectional view taken through a vehicle body having an occupant restraint belt system including the buckle assembly of this invention;

FIG. 2 is an enlarged view of the latch plate assembly of the buckle assembly taken generally in the direction of arrows 2—2 of FIG. 1 and illustrates the latch plate assembly of the buckle assembly;

DETAILED DESCRIPTION OF THE PREFERRED EMBODIMENT

Figures 1, 2:
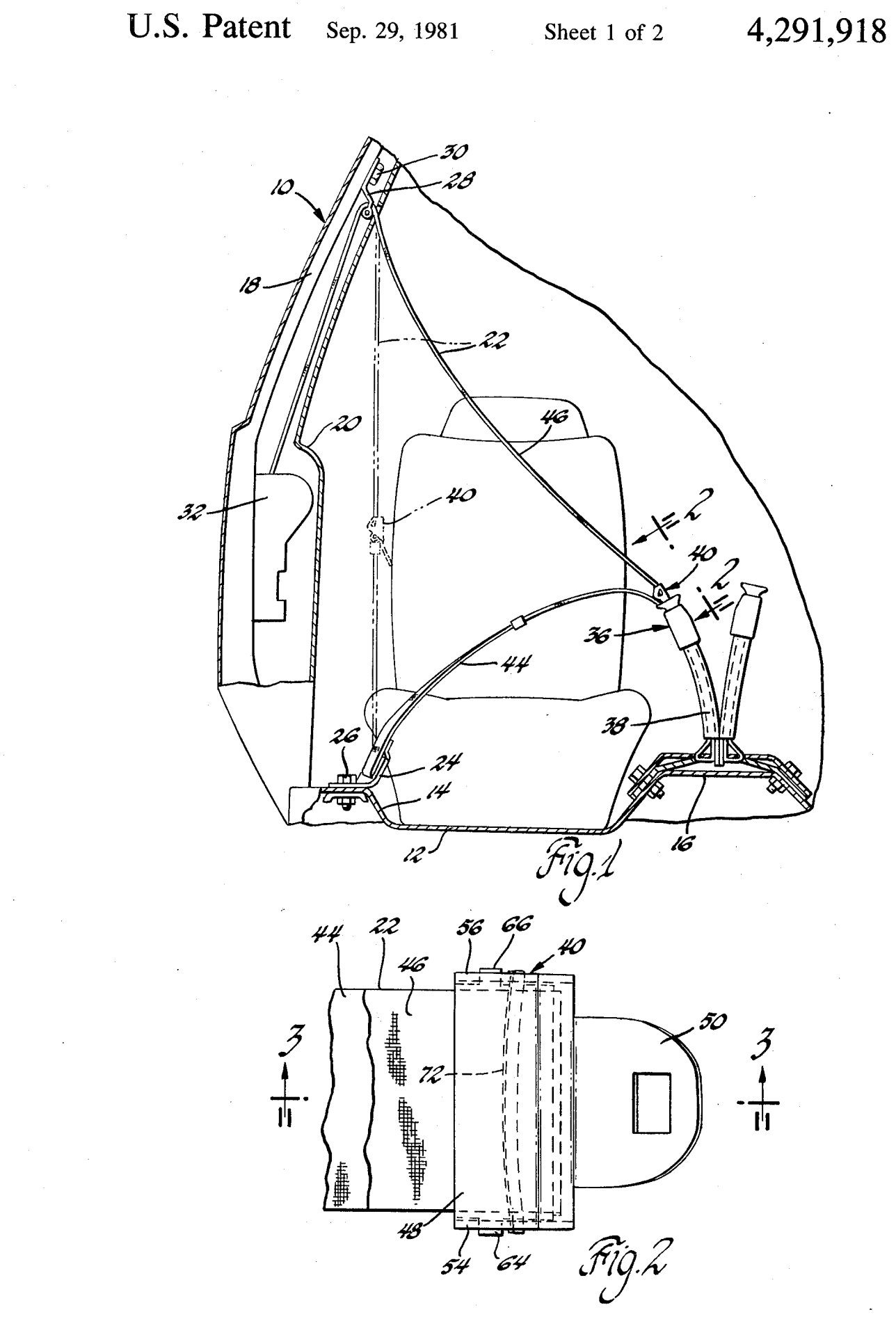
Figure 3:
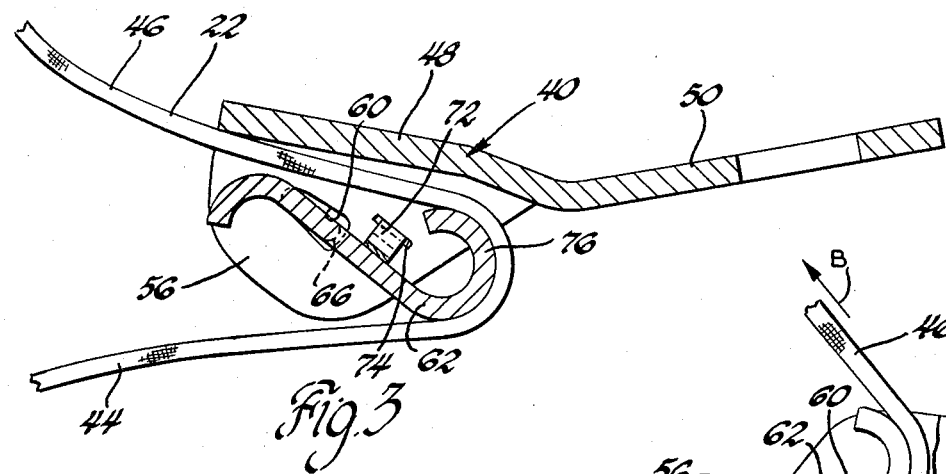
FIG. 3 is a sectional view of the latch plate assembly of FIG. 2 taken in the direction of arrows 3—3 of FIG. 2.

Referring generally to FIG. 1, a vehicle body indicated by numeral 10 includes a floor 12 having an outboard sill 14 and an inboard transmission tunnel 16. A pillar 18 extends vertically adjacent the rear of the seat outboard thereof and includes a trim panel 20 facing the passenger compartment of the vehicle body.

An occupant restraint system includes a continuous loop restraint belt 22 having a lower end attached to the sill 14 by an anchor plate 24 and bolt assembly 26. The upper end of the continuous loop belt 22 passes through a slide loop 28 attached to the pillar 18 by a bolt 30 and downwardly to a shoulder belt retractor 32 which normally winds the continuous loop belt 22 to a phantom line indicated stowed position extending generally vertically along the trim panel 20.

A seat belt buckle 36 is mounted on the transmission tunnel 16 by a semi-rigid anchor strap 38. A latch plate assembly 40 is slidable along the continuous loop belt 22 and divides the continuous loop belt 22 into a lap belt portion 44 and a shoulder belt portion 46 when the latch plate assembly 40 is engaged within the buckle 36.

Figure 4:
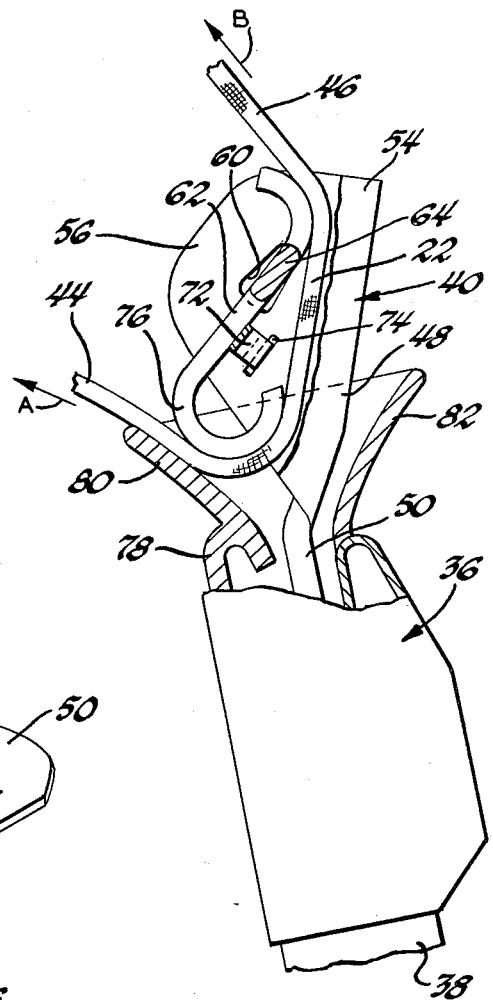
FIG. 4 is a partial sectional view showing the latch plate assembly of FIGS. 2 and 3 engaged within a mating buckle.
Figure 5:
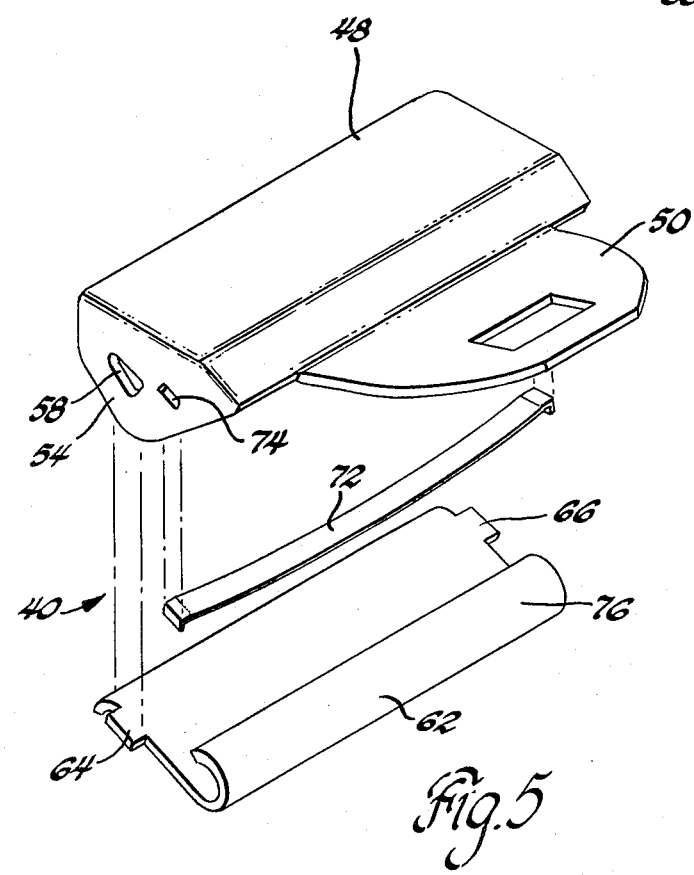
FIG. 5 is an exploded perspective view of the latch plate assembly.

Referring to FIGS. 2, 3 and 5, it is seen that the latch plate assembly 40 includes a stamped steel frame member 48 having an apertured tongue portion 50 which is adapted for insertion into the buckle 36 as will be described further hereinafter. The stamped steel frame 48 also has a pair of spaced apart downturned flanges 54 and 56 having aligned triangular shaped apertures 58 and 60. A generally S-shaped or J-shaped cinching member 62 has tabs 64 and 66 extending from the ends thereof into the triangular shaped apertures 58 and 60 to mount the cinching member 62 for limited pivotal movement. The latch plate assembly also has a leaf spring 72, the ends of which extend through aligned apertures 74 of the downturned flanges 54 and 56 to urge the cinching member 62 to a normal position shown in FIGS. 3 and 4.

Referring to FIG. 3, it is seen that the J-shaped cinching member 62 has a curled portion 76 which remains spaced from the frame 48 by a distance greater than the thickness of the continuous loop belt 22. Accordingly, although the belt 22 passes around the curled portion 76, the continuous loop 22 is not frictionally clamped against the frame 48 so that the latch plate assembly 40 will drop freely toward the floor of the vehicle when the belt assumes the vertical stowed phantom-line position of FIG. 1.

Referring to FIG. 4, the latch plate assembly 40 is shown engaged within the buckle 36. The buckle includes a frame 78 having an integral lip 80 which projects outwardly into proximity with the continuous loop belt 22. The buckle 36 has a conventional latch member, not shown, adapted to engage within the apertured tongue 50 of the latch plate assembly 40 to retain the latch plate assembly 40 within the buckle 36. The buckle also has a selectively actuable pushbutton mechanism or the like for disengaging the latch member from the apertured tongue 50 to permit removal of the latch plate assembly 40 to the phantom-line indicated stowed position of FIG. 1.

Referring to FIG. 4, it is seen that the distance between the lip 80 of the buckle 36 and the curled portion 76 of the latch plate cinching member 62 is such that the continuous loop belt 22 will be clamped therebetween when a force is exerted in the direction indicated by the arrow A which would lengthen the lap belt portion 44 and shorten the shoulder belt portion 46. More particularly, an attempted movement of the lap belt 44 in the direction A pivots the cinching member 62 in the clockwise direction, thereby clamping the continuous loop belt 22 against the buckle lip 80 to prevent sliding movement of the belt therethrough.

An attempted movement of the belt 22 in the direction of arrow B pivots the cinching member 62 in the counter clockwise direction which moves the curled portion 76 away from the buckle lip 80 so that the belt may pass freely in the direction to shorten the lap belt 44. The leaf spring 72 preloads the cinching member 62 to establish a slight clamping load on the belt 22 against the lip 80.

Referring again to FIG. 4, it is seen that a matching lip portion 82 may be provided on the opposite side of the buckle 36 from the lip 80 in order to funnel the tongue 50 into the buckle 36 as well as cooperate with the cinching member 62 in clamping the belt 22 in those instances where the belts become twisted or an occupant of an adjacent seat attempts to insert his latch plate assembly within the buckle 36.

Thus it is seen that the invention provides a new and improved buckle assembly for a continuous loop belt system having the advantage of permitting free falling of the latch plate along the belt when the latch belt is disengaged from the buckle and clamping the continuous loop belt against a lip of the buckle when the latch plate is engaged within the buckle.

The embodiments of the invention in which an exclusive property or privilege is claimed are defined as follows:

1. In combination, a single loop continuous restraint belt, a latch plate slidably movable along the restraint belt to divide the restraint belt into variable length shoulder belt and lap belt portions, a buckle having a frame and means adapted for latching engagement with the latch plate to establish the lap and shoulder belt portions in their respective restraining positions across a seated occupant, a cinching member pivotally mounted on the latch plate and having the restraint belt passing therearound so that sliding movement of the belt through the latch plate in either direction induces pivotal movement of the cinching member in a corresponding direction of rotation, and a lip member integral with the frame of the buckle and projecting into proximity with the restraint belt generally along one side of the cinching member and adapted to provide an abutment surface against which the cinching member clamps the restraint belt upon attempted sliding movement of the restraint belt through the latch plate in the one direction which pivots the cinching member toward the lip member whereby the restraint belt is permitted to travel in only the other direction when the latch plate is engaged within the buckle.

2. In combination, a single loop continuous restraint belt, a latch plate slidably movable along the restraint belt to divide the restraint belt into variable length shoulder belt and lap belt portions, a buckle having a frame and means adapted for latching engagement with the latch plate to establish the lap and shoulder belt portions in their respective restraining positions across a seated occupant, a cinching member pivotally mounted on the latch plate and having the restraint belt passing therearound so that sliding movement of the belt through the latch plate in either direction induces pivotal movement of the cinching member in a corresponding direction of rotation, a lip member integral with the frame of the buckle and projecting into proximity with the restraint belt generally along one side of the cinching member and adapted to provide an abutment surface against which the cinching member clamps the restraint belt upon attempted sliding movement of the restraint belt through the latch plate in the one direction which pivots the cinching member toward the lip member whereby the restraint belt is permitted to travel in only the other direction when the latch plate is engaged within the buckle, and said cinching member being spaced from the latch plate sufficiently to permit free sliding travel of the belt therebetween in either direction when the latch plate is disengaged from the buckle.

* * * * *